US008855118B2

(12) United States Patent
Kannan

(10) Patent No.: US 8,855,118 B2
(45) Date of Patent: Oct. 7, 2014

(54) SOURCE DISCOVERY FOR NON-FLOODING MULTICAST USING OPENFLOW

(71) Applicant: Hewlett Packard Development Company, L.P., Houston, TX (US)

(72) Inventor: Madhu Prashanth Kannan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 198 days.

(21) Appl. No.: 13/626,571

(22) Filed: Sep. 25, 2012

(65) Prior Publication Data

US 2014/0029410 A1    Jan. 30, 2014

(30) Foreign Application Priority Data

Jul. 30, 2012 (IN) ............................ 3116/CHE/2012

(51) Int. Cl.
*H04L 12/16* (2006.01)
*H04L 12/28* (2006.01)

(52) U.S. Cl.
USPC ............................ 370/392; 370/432; 709/244

(58) Field of Classification Search
USPC ......... 370/218, 390, 392, 229, 252, 254, 389, 370/432; 709/238, 244
See application file for complete search history.

(56) References Cited

U.S. PATENT DOCUMENTS

| 6,636,895 | B1 * | 10/2003 | Li et al. ........................ 709/238 |
| 7,289,505 | B2 * | 10/2007 | Sanchez et al. ............... 370/393 |
| 7,725,925 | B2 * | 5/2010 | Liu et al. .......................... 726/3 |
| 7,835,276 | B2 * | 11/2010 | Naik et al. .................... 370/230 |
| 8,510,551 | B1 * | 8/2013 | Desai et al. ................... 713/163 |
| 8,611,254 | B2 * | 12/2013 | Brown .......................... 370/255 |
| 2009/0138577 | A1 | 5/2009 | Casado et al. |
| 2011/0211583 | A1 | 9/2011 | Seetharaman et al. |
| 2011/0271007 | A1 | 11/2011 | Wang et al. |
| 2012/0099591 | A1 | 4/2012 | Kotha et al. |
| 2013/0276135 | A1 * | 10/2013 | Conklin et al. ................. 726/27 |
| 2013/0336318 | A1 * | 12/2013 | Kannan et al. ................ 370/390 |

OTHER PUBLICATIONS

Inter-domain Multicast {MBGP/MSDP}, (Web Page), Aug. 11, 2010. http://prakashkalsaria.wordpress.com/category/multicast-vpn/.
Oltsik J., et al., "IBM and NEC Bring SDN/OpenFlow to Enterprise Data Center Networks", (Research Paper), Jan. 2012.

* cited by examiner

Primary Examiner — Ahmed Elallam

(57) ABSTRACT

Provided is a method of source discovery for non-flooding multicast using OpenFlow. A data packet is received from a source address on a network device. The data packet is routed from the network device to an OpenFlow controller. The OpenFlow controller identifies a rendezvous point (RP) of the network device, maps a random address to the source address in a port used for connecting with the rendezvous point (RP), generates a flow message containing a rule for handling the data packet, transmits the flow message to the network device and adds a flow entry in the network device based on the rule for handling the data packet.

15 Claims, 4 Drawing Sheets

SOURCE DISCOVERY FOR NON-FLOODING MULTICAST USING OPENFLOW

CLAIM FOR PRIORITY

The present application claims priority under 35 U.S.C 119 (a)-(d) to Indian Patent application number 3116/CHE/2012, filed on Jul. 30, 2012, which is incorporated by reference in its entirety.

BACKGROUND

Computers have become pervasive both in human communication and interaction. Supported by increased bandwidth speed and network availability, computers have acquired a key position even in the entertainment space, previously dominated by television sets and radios. So much so that enterprises are increasingly looking at novel and efficient ways of providing various engaging solutions, be it in knowledge domain, entertainment or otherwise, to its millions of present and potential customers. One such technology which is being increasingly favored, for its efficiency to provide rich content over a network, is the multicast technology.

Multicast is a mechanism for transmitting data from a single source (for example, a server) to multiple receivers (for example, personal computers) on a network. Multicast packets are replicated down appropriate paths in a network to create the most efficient routing mechanism possible. The sender is required to send a data packet only once, even if the packet needs to be delivered to multiple receivers.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

As mentioned earlier, multicast technology is being increasingly favored by organizations to send data (especially, multimedia content) over a network. Multicast packets are forwarded through a network by using a distribution tree. The network replicates a data packet at each node (for example, routers or switches) of the network so that data (or messages) is sent over each node (link) of the network only once. When a receiver joins a multicast group, a multicast distribution tree is constructed for that group. Once a data packet is sent by a sender to a multicast group, it reaches all receivers who have joined the group. Also, the multicast distribution does not require a source to know about the receivers who have joined a multicast group. This makes the mechanism (distribution) extremely efficient in sharing the same information amongst many receivers, thereby improving network utilization in a cost effective way.

Many multicast routing protocols, such as the Protocol Independent Multicast (PIM) family of routing protocols, use the Reverse Path Forward (RPF) concept to help define the criteria for the protocol to accept incoming data packets. When a multicast packet comes through a router, the router performs an RPF check on the packet. The router first looks up the source address in the unicast routing table to see whether the packet that arrived on the same interface would be the reverse path back to the source. If the packet arrives on the correct interface leading to the source, the check is successful and the packet is forwarded. If the RPF check fails, the packet is dropped. PIM does not typically maintain a Multicast routing data base, but instead uses the router's Forwarding Information Base (FIB). The multicast routing protocol is independent of the unicast routing protocol, but uses the FIB created by the unicast routing protocol as the basis to make RPF decisions.

Situations arise where the network has constraints as to which paths the unicast traffic and multicast traffic should traverse. Since PIM uses the unicast FIB to determine incoming interfaces, it may cause a congruence of the unicast and multicast paths. Said differently, the net result of a PIM RPF check using the unicast FIB is that unicast traffic destined to a particular address may traverse the same interface on the router as multicast traffic sourced from the same source.

Proposed is a solution that allows a device to use an OpenFlow based controller for multicast source discovery in non flooding multicast routing domains. The solution enables origin of new traffic into a multicast domain where the desired path to the source is not congruent with the path used by unicast traffic.

Figure 1:
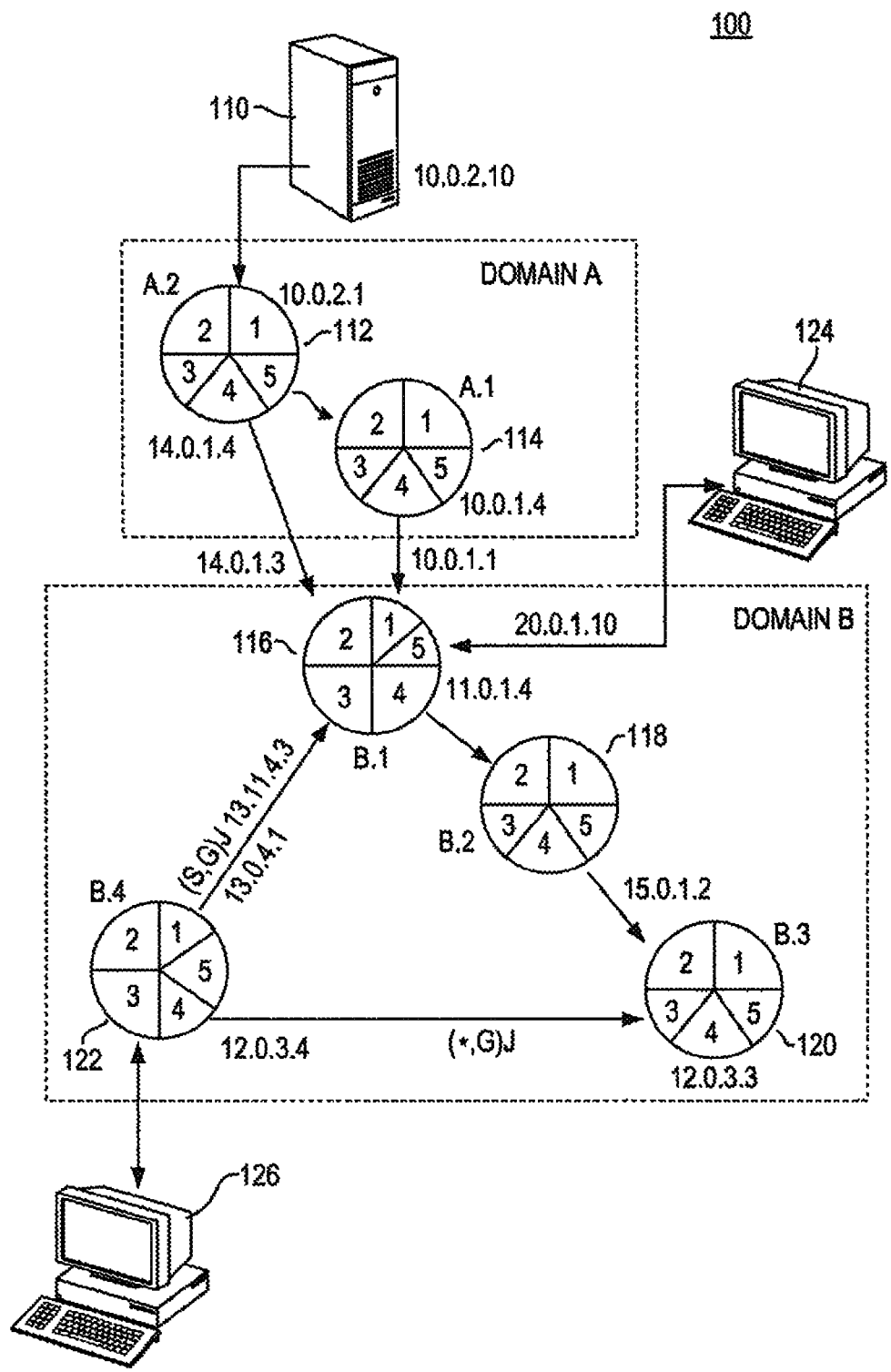
FIG. 1 is a schematic block diagram of a multicast system according to an example.

FIG. 1 is a schematic block diagram of a multicast system according to an example.

Multicast system 100 includes a multicast source system 110, network devices (such as, routers and switches) 112, 114, 116, 118, 120, 122, OpenFlow controller system 124 and computer system 126.

Multicast source system 110 is connected to network devices 112, 114, 116, 118, 120, 122 and OpenFlow controller system 124 through a network, which may be wired or wireless. The network may be a public network, such as, the Internet, or a private network, such as, an intranet. The number of network devices 112, 114, 116, 118, 120, 122 illustrated in FIG. 1 is by way of example, and not limitation. The number of network devices used in a multicast system 100 may vary in other implementations. Similarly, there may be additional multicast source systems and OpenFlow controller systems in other implementations.

Multicast source system 110 is a computing system (for example, a computer server, a desktop computer, and the like) that hosts multicast content. Multicast content may be shared with multicast receivers (i.e. user computer systems; not illustrated in FIG. 1) through network devices 112, 114, 116, 118, 120, 122. Multicast source system transmits multicast content to user computer systems through network devices 112, 114, 116, 118, 120, 122. Multicast content on multicast source system 110 may include data, image, audio, video, multimedia, and other like content.

Network devices 112, 114, 116, 118, 120, 122 may be, but not limited to, a network switch, virtual switch, or router (for example, an edge router, a subscriber edge router, an Inter-provider Border Router or a core router). In an implementation, network devices 112, 114, 116, 118, 120, 122 are OpenFlow enabled devices. Network devices 112, 114, 116, 118, 120, 122 transfer multicast data from a multicast source to end user systems or devices (i.e. multicast receivers).

Figure 2:
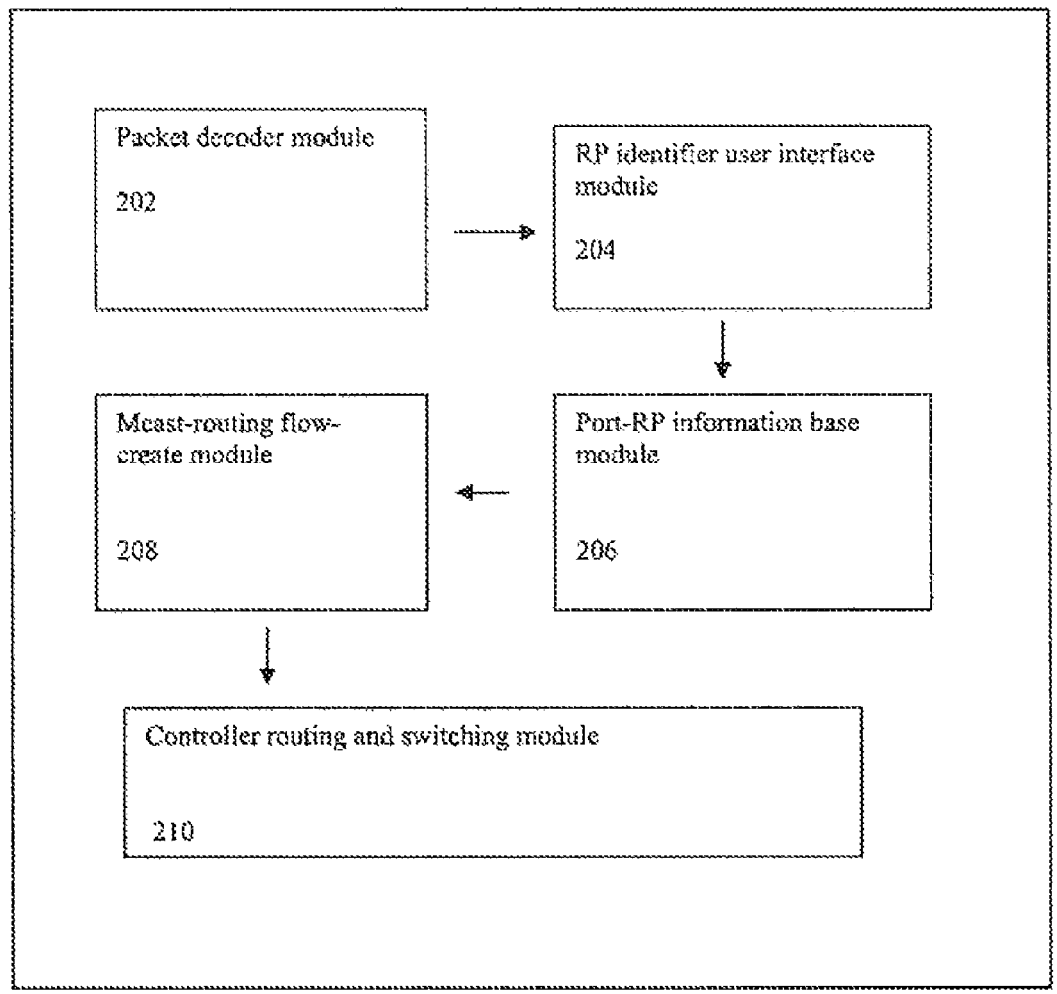
FIG. 2 is a schematic block diagram of an OpenFlow controller system of FIG. 1, according to an example.

OpenFlow controller system 124 is a computing system (for example, a personal computer, a computer server, and the like) that supports OpenFlow. OpenFlow is an open standard communications protocol that gives access to the forwarding plane of a network switch or router over a network. It provides an open protocol to program a flow table in a network device (such as, a router) thereby controlling the way data packets are routed in a network. Through OpenFlow, the data and control logic of a network device are separated, and the control logic is moved to an external controller such as OpenFlow controller system 124. The OpenFlow controller system 124 maintains all of network rules and distributes the appropriate instructions to network devices 112, 114, 116, 118, 120, 122. It essentially centralizes the network intelligence, while the network maintains a distributed forwarding plane through OpenFlow-enabled network devices. Components of OpenFlow controller system 124 are illustrated in FIG. 2 and described below.

Computer system 126 may be a desktop computer, notebook computer, tablet computer, computer server, mobile phone, personal digital assistant (PDA), or the like, with a client or multicast application enabled for running Internet Group Management Protocol (IGMP).

In an example, the multicast system 100 may work as follows. The multicast source system 110 sends multicast content to router 112. The router 112 in turn routes the content to router 114. Router 114 forwards the content to router 116, who forwards it to router 120. From router 120, the multicast content flows to 122, who in turn may pass it to a receiver.

Multicast technology allows only authentic user computer systems, who have subscribed to a particular content data flow of a content server, to receive the content. User systems signify their willingness to receive a particular data from a content server by joining a particular multicast group. Once the user systems join a particular group, a multicast distribution tree is created for that group. The flow of data from multicast source system 112 to receiver devices may be managed by a multicast protocol. Some of the most common protocols used to manage flow of data in a multicast system, such as that of FIG. 1, may include, but not limited to, Internet Group Management Protocol (IGMP), Protocol Independent Multicast PIM, Distance Vector Multicast Routing Protocol (DVMRP), User Datagram Protocol (UDP), and Pragmatic General Multicast (PGM).

FIG. 1 also illustrates in a schematic way the data flow (illustrated with pointed arrows) from multicast source system 110 to receiver devices through network devices 112, 114, 116, 118, 120, 122. Data flow represents the flow of content/data within the multicast system 100.

In an implementation, the multicast system 100 may use PIM Sparse multicast routing protocol for forwarding of a new source. The routers 112, 114, 116, 118, 120, 122 in the multicast system 100 are segregated into two multicast domains: Domain A and Domain B. Domain A includes routers 112 and 114 (labeled A.2 and A.1 respectively), whereas Domain B includes routers 116, 118, 120 and 122 (labeled B.1, B.2, B.3 and B.4 respectively). The segregation of routers 112, 114, 116, 118, 120, 122 between domains A and B is by way of example, and not limitation. The number of routers in a multicast domain may vary in other implementations. The router interfaces are designated in a manner such that for domain B, router B.3, interface 2 is designated B.3.2

FIG. 2 is a schematic block diagram of an OpenFlow controller system of FIG. 1, according to an example.

OpenFlow controller system 124 may include and/or support standard OpenFlow controller components. In an implementation, OpenFlow controller system 124 includes Packet decoder module 202, RP identifier user interface (UI) module 204, Port-RP Information base module 206, Mcast-routing flow create module 208 and Controller routing and switching module 210.

Packet decoder module 202 decodes a data packet received by OpenFlow controller system 124. Upon receipt of a data packet from a network device (for example, a router), the packet decoder module decodes the data packet and identifies a multicast data packet based on Destination address in the data packet. In an implementation, the data packet is decoded into source and destination MAC address, VLAN ID, source and destination IP address, source and destination port, protocol type, etc.

RP identifier user interface (UI) module 204 identifies the rendezvous point (RP) of a multicast domain. The RP is the point at which receivers join to learn of active sources. The RP acts as a mediator between a source(s) and receivers. Each PIM Domain contains its own RP i.e. RP is different for B domain and A domain Port-RP Information base module 206 is used to identify the port on which a rendezvous point (RP) can be reached using the controller routing and switching module 210. Once identified, port-RP Information base module 206 obtains the IP subnet details of the identified port. Port-RP Information base module 206 also generates a random address in the same subnet as that of RP address, which is mapped to the original source address. In an implementation, mapping of original source address to virtual address is carried out with the help of a hash table (in other implementations different data structures may be used). The hash table uses the original source address as the "key" and virtual address as "value".

Mcast-routing flow create module 208 generates a flow which contains the rule for treating a packet that was sent to the OpenFlow controller system 124 in the first instance since the receiving router did not have an entry (related to the packet) in its flow table. Once created, the flow rule is pushed out to the receiving router using controller routing and switching module 210.

Controller routing and switching module 210 is used to send a flow rule created in respect of a multicast packet by mcast-routing flow create module 208 to the router that had forwarded the multicast packet to the OpenFlow controller system 124 in the first place.

Figure 3:
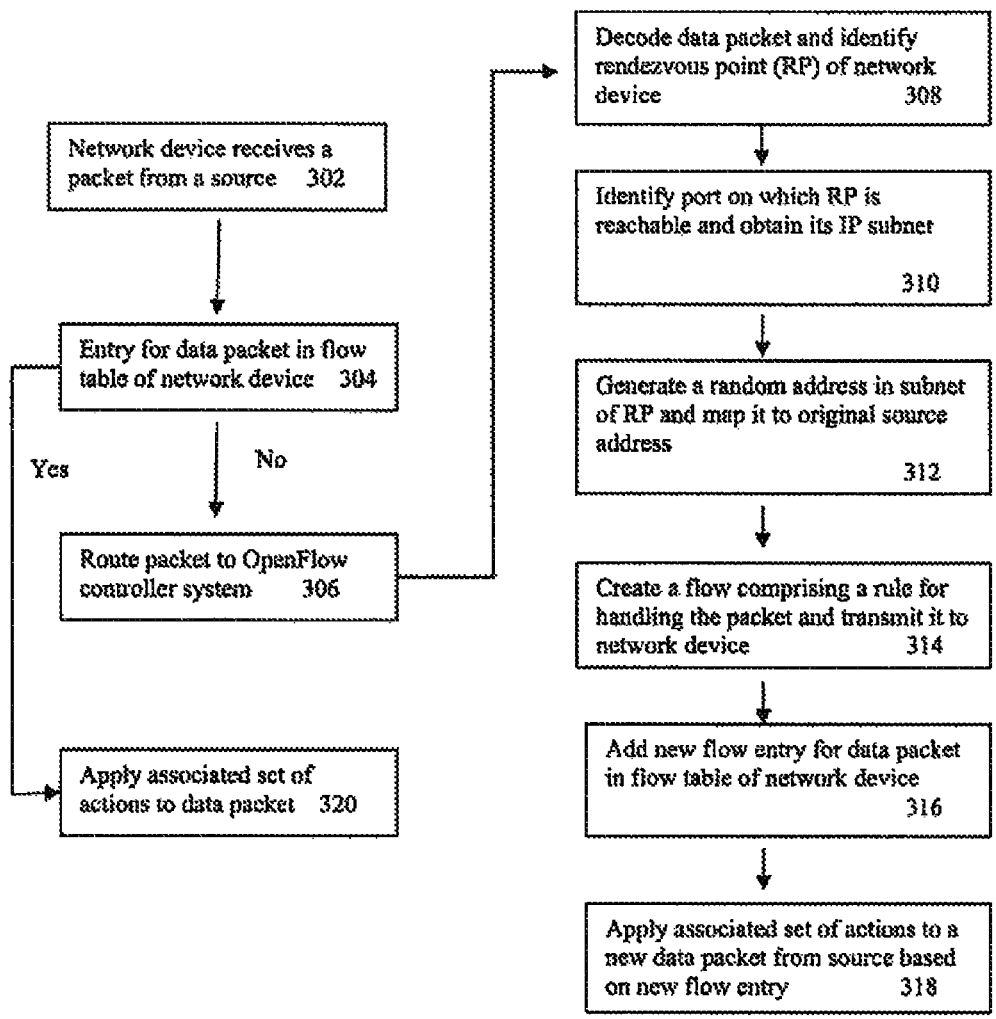
FIG. 3 shows a flow chart of a method of source discovery for non-flooding multicast using OpenFlow, according to an example.

FIG. 3 shows a flow chart of a method of source discovery for non-flooding multicast using OpenFlow. During description references are made to FIG. 1 to illustrate the flow of traffic in a multicast system, according to an implementation. In the present example, flow of data from multicast Domain A to Domain B is described below.

At block 302, a multicast source system (such as multicast source system 110) sends a data packet (239.3.3.3, 10.0.2.10) that progresses through Domain A to a network device, such as router A.1 (i.e. end of Domain A) and is flooded. In the present illustrated example, the multicast source's address is 10.0.2.10 and the destination address is 239.3.3.3. From A.1 the data packet is routed to router B.1, which receives it on B.1.1 interface.

At router B.1, a reverse path forwarding (RPF) check is performed on the data packet. Assuming the Forwarding Information Base (FIB) for B.1 shows that to reach the multicast source system 110 (10.0.2.10), the 10.0.1.0/24 route is reached via A.2.4 (10.0.2.4), because the interface A.1.4 is on the interface B.1.2. In such case, the packet fails RPF check for B.1 and is dropped.

In addition, router B.4 receives an IGMP (Internet Group Management Protocol) join on B.4.3 interface for group 239.3.3.3. In response to join request, router B.4 sends (*, 239.3.3.3) PIM join towards router B.3 (which is the RP for the domain with IP address 11.0.1.3) on router B.4.4 interface. Router B.3 receives the packet but since it has not seen any traffic for the multicast group 239.3.3.3, the RP cannot send any traffic to R4.

At block 304, router B.1 (which is OpenFlow enabled) looks up the packet in its flow table to perform the associated set of actions. In the event the flow table does not have an entry for the data packet, it is routed to OpenFlow controller system 124 for processing (block 306).

At block 308, a packet decoder module of OpenFlow controller system 124 decodes the data packet and identifies a multicast data packet based on source address. Next, a RP identifier user interface module is used to identify the rendezvous point (RP) of the multicast domain to which router B.1 belongs.

At block 310, a port-RP Information base module is used to identify the port on which a rendezvous point (RP) can be reached. In the present example, port towards RP is identified as B.1.4. After the port has been identified, the module obtains the IP subnet details of the identified port. In the present example, IP subnet of port B.1.4 is 11.0.1.4/24.

At block 312, port-RP Information base module generates a random address in the same subnet as that of RP address, which is mapped to the original source address. In an implementation, mapping of original source address to virtual address is carried out with the help of a hash table. The hash table uses the original source address as the "key" and virtual address as "value". In the present example, 10.0.2.10 of source received on B.1.1 is mapped to 11.0.1.40 virtual address in a hash table.

At block 314, after conversion of original source address 10.0.2.10 to virtual (random) address 11.0.1.40, mcast-routing flow create module generates a flow which contains a rule for treating such type of data packets. In the present example, the flow rule may be: controller add-flow tcp:20.0.1.11:6633 ip, nw_dst=239.3.3.3, nw_src=10.0.2.10 idle_timeout=0, actions=mod_nw_src:11.0.1.40,output:B.1.4.

At block 316, the flow rule is then sent to router B.1 using a controller service to push flows to routers.

At block 318, once router B.1 has received the flow rule, every subsequent packet from source address 10.0.2.10 matching multicast group destination address 239.3.3.3 is forwarded to B.1.4 interface. This occurs because a new packet matches the flow table in the router. In other words, the flow rule is applied to all new packets that arrive on router B.1 and which have source address 10.0.2.10 and multicast group destination address 239.3.3.3.

In another scenario, if a new source sends a packet meant for destination address 239.3.3.3 then the above process is repeated with a difference that the hash table is updated with a new virtual address to source mapping. In this case, a new flow is appended to router flow table.

In the above described implementation, the scenario under consideration was that a packet has originated from an original multicast source system. In another implementation, however, there may be a scenario where an (S, G) join packet is received from a destination (i.e. a receiver). An example of the aforesaid scenario is described below with reference to FIG. 1.

Let's assume that a packet comes to router B.1.3 from router B.4.1 with a join request for specific (S,G). In such case also, the packet is routed to the OpenFlow controller system from router B.1. In the OpenFlow controller system, the packet is decoded by the controller's decoder module. Once decoded, the controller triggers the mcast-routing flow create module to create another hash table (for example, hash table 2) which contains details about virtual address of the source and the receiver who are interested in receiving packet from the virtual address. The mcast-routing flow create module than adds an entry to hash table 2 specifying all receivers who are interested in receiving data from that source. The reason for using virtual address instead of using original address is to avoid additional lookup in the earlier hash table.

Once hash table 2 is created, each time a new packet comes from the same source for a specific group, the entry is modified by the flow which is configured in switch and goes to destination using the virtually configured address. In the present example, controller mod-flow tcp:20.0.1.11:6633 ip, nw_dst=239.3.3.3, nw_src=10.0.2.10 idle_timeout=0, actions=mod_nw_src:130.0.4.30 output:B.1.3

If at a later time, a (S,G) prune request Is received the flow is modified to OpenFlow controller system. In the present example, add-flow tcp:20.0.1.11:6633 ip, nw_dst=239.3.3.3, nw_src=10.0.2.10 idle_timeout=0, actions=drop.

Thus, in both aforementioned scenarios, OpenFlow controller system 124 has a rule matching destination address 239.3.3.3 and the rule is written onto the router B.1.

In an implementation, the rule is executed on the data packet and the packet source address 10.0.2.1 is modified to 11.0.1.4. The data packet is then forwarded to B.2 router on B.1.4. This indicates that the packet originated from a directly connected route upstream to B.2.2 interface of router B.2. The data packet, therefore, passes RPF check and is processed by PIM router, allowing source discovery. Subsequently, the packet is sent to the RP as register packet which is de-encapsulated and forwarded to waiting receiver router B.4.

In an implementation, router B.4 reads the packet and identifies that the shortest path to 11.0.1.4 is via B.4.1 and not B.4.4. Therefore, it sends a (*, G) prune to RP B.3.2 and sends (S, G) Join to B.1.3 interface 13.0.4.3. The PIM packet analyzer in controller identifies the port on which (S,G) was received and checks for rule and re-configures the rule. In the present example, this would be "controller mod-flow tcp: 20.0.1.11:6633 ip, nw_dst=239.3.3.3, idle_timeout=0, actions=mod_nw_src:13.0.4.3,output:B.1.3" which is now active flow rule for next packets received on B.1.1 interface. In an implementation, the controller may also append to the rule to allow packet over both B.1.3 and B.1.4.

The OpenFlow controller system may configure router B.1 to drop PIM hello packets from router A.2 to ensure router B.1 does not form adjacency. This may be done by using the rule "controller add-flow tcp:20.0.1.11:6633 ip, nw_dst=224.0.0.13, idle_timeout=0, actions=drop".

In case router B.1 is directly connected to RP B.3, PIM registration process is not required, and the native multicast packets will be processed by RP.

Router B.1 is configured using OpenFlow controller system with source discovery such that a path used by multicast traffic is different from path used for unicast traffic. Openflow flow table is configured on B.1 such that it takes precedence over FIB table of the router. If the flow table does not have a matching route, then normal action is performed where the router FIB takes precedence. Therefore, unicast traffic which will not match flow table will be routed based on FIB of router B.1

Figure 4:
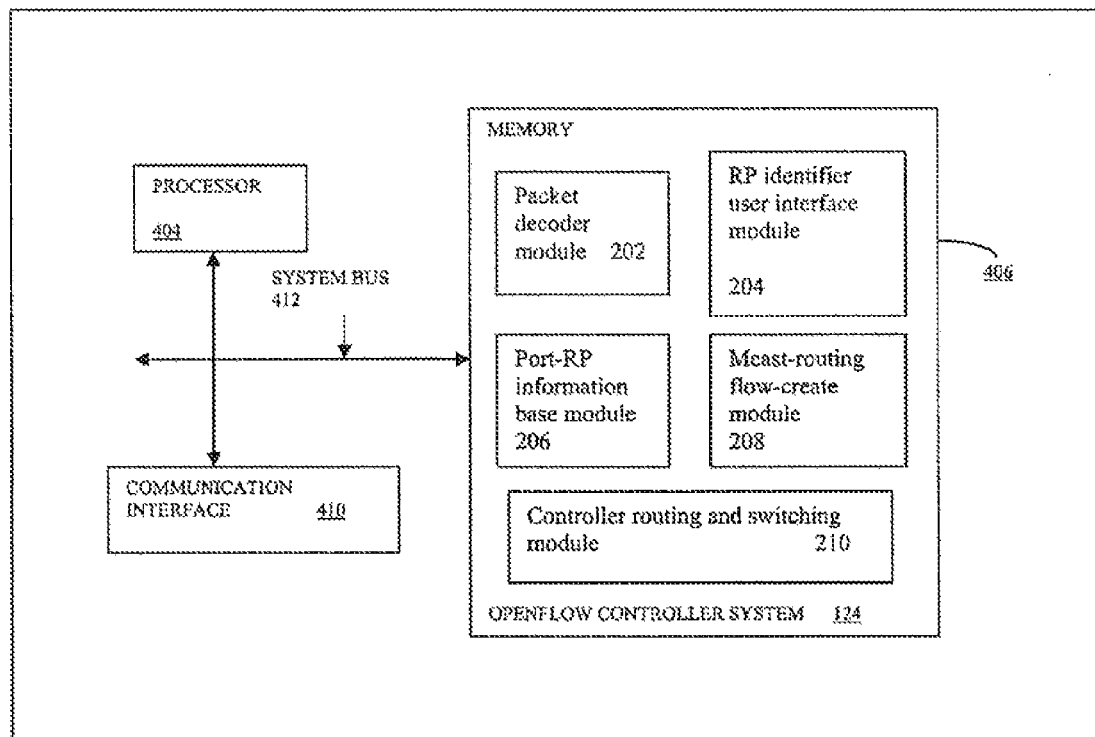
FIG. 4 is a schematic block diagram of an OpenFlow controller system hosted on a computer system, according to an example.

FIG. 4 is a schematic block diagram of an OpenFlow controller system hosted on a computer system, according to an example.

Computer system 402 may include processor 404, memory 406, message routing system 408 and a communication interface 410. OpenFlow controller system 124 includes packet decoder module 202, RP identifier user interface (UI) module 204, Port-RP Information base module 206, Mcast-routing flow create module 208 and Controller routing and switching module 210. The components of the computing system 402 may be coupled together through a system bus 412.

Processor 404 may include any type of processor, microprocessor, or processing logic that interprets and executes instructions.

Memory 406 may include a random access memory (RAM) or another type of dynamic storage device that may store information and instructions non-transitorily for execution by processor 404. For example, memory 406 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 406 may include instructions that when executed by processor 404 implement OpenFlow controller system 124.

Communication interface 410 may include any transceiver-like mechanism that enables computing device 402 to communicate with other devices and/or systems via a communication link. Communication interface 410 may be a software program, a hard ware, a firmware, or any combination thereof. Communication interface 410 may use a variety of communication technologies to enable communication between computer system 402 and another computer system or device. To provide a few non-limiting examples, communication interface 410 may be an Ethernet card, a modem, an integrated services digital network ("ISDN") card, etc.

OpenFlow controller system 124 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

In an implementation, OpenFlow controller system 124 may be read into memory 406 from another computer-readable medium, such as data storage device, or from another device via communication interface 410.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of source discovery for non-flooding multicast using OpenFlow, comprising:
 receiving a data packet from a source address on a network device;
 routing the data packet from the network device to an OpenFlow controller;
 identifying a rendezvous point (RP) of the network device in the OpenFlow controller;
 mapping a random address to the source address in a port used for to connecting with the rendezvous point (RP) in the OpenFlow controller;
 generating a flow message containing a rule for handling the data packet in the OpenFlow controller;
 transmitting the flow message to the network device; and
 adding a flow entry in the network device based on the rule for handling the data packet.

2. The method of claim 1, further comprising routing a subsequent data packet from the source address based on the flow entry in the network device.

3. The method of claim 1, further comprising identifying a subnet of the port used for connecting with the rendezvous point (RP) in the OpenFlow controller.

4. The method of claim 3, wherein mapping of the random address to the source address occurs in the subnet of the port used for connecting with the rendezvous point (RP).

5. The method of claim 1, wherein mapping of the random address to the source address is performed using a data structure.

6. The method of claim 5, wherein the data structure is a hash table.

7. The method of claim 1, further comprising identifying the port used for connecting with the rendezvous point (RP) in the OpenFlow controller.

8. A network system, comprising:
 a network device to receive a data packet from a source address; and
 an OpenFlow controller to:
 receive the data packet from the network device;
 identify a rendezvous point (RP) of the network device;
 map a random address to the source address in a port used for connecting with the rendezvous point (RP);
 generate a flow message containing a rule for handling the data packet;
 transmit the flow message to the network device; and
 add a flow entry in the network device based on the rule for handling the data packet.

9. The system of claim 8, wherein a subsequent data packet is routed from the source address based on the flow entry in the network device.

10. The system of claim 8, further comprising a port-RP information base module to identify a subnet of the port used for connecting with the rendezvous point (RP) in the OpenFlow controller.

11. The system of claim 10, wherein the port-RP information base module maps the random address to the source address occurs in the subnet of the port used for connecting with the rendezvous point (RP).

12. The system of claim 8, wherein the data packet is forwarded to the OpenFlow controller if a reverse path forwarding check on the data packet fails at the network device.

13. The system of claim 8, wherein the data packet is a first data packet from the source address to the network device.

14. The system of claim 8, wherein the flow entry in the network device specifies a network route of the data packet.

15. A non-transitory computer readable medium, the non-transitory computer readable medium comprising machine executable instructions, the machine executable instructions when executed by a computer system causes the computer system to:
  receive a data packet from a source address on a network device;
  identify a rendezvous point (RP) of the network device;
  map a random address to the source address in a port used for connecting with the rendezvous point (RP);
  generate a flow message containing a rule for handling the data packet;
  transmit the flow message to the network device; and
  add a flow entry in the network device based on the rule for handling the data packet.

\* \* \* \* \*

UNITED STATES PATENT AND TRADEMARK OFFICE
CERTIFICATE OF CORRECTION

| | | |
|---|---|---|
| PATENT NO. | : 8,855,118 B2 | Page 1 of 1 |
| APPLICATION NO. | : 13/626571 | |
| DATED | : October 7, 2014 | |
| INVENTOR(S) | : Madhu Prashanth Kannan | |

It is certified that error appears in the above-identified patent and that said Letters Patent is hereby corrected as shown below:

In the Claims

In column 8, line 20, in Claim 1, delete "for to" and insert -- for --, therefor.

Signed and Sealed this
Tenth Day of March, 2015

Michelle K. Lee
*Deputy Director of the United States Patent and Trademark Office*